(12) United States Patent
Nagai

(10) Patent No.: US 9,398,194 B2
(45) Date of Patent: Jul. 19, 2016

(54) IMAGE PROCESSING APPARATUS AND METHOD PERFORMING DENSITY ADJUSTMENT ON IMAGE DATA BASED ON GENERATED DENSITY CHARACTERISTICS DATA

(71) Applicant: CANON KABUSHIKI KAISHA, Tokyo (JP)

(72) Inventor: Jun Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/499,882

(22) Filed: Sep. 29, 2014

(65) Prior Publication Data
US 2015/0098098 A1 Apr. 9, 2015

(30) Foreign Application Priority Data
Oct. 7, 2013 (JP) .................................. 2013-210404

(51) Int. Cl.
*H04N 1/407* (2006.01)
*H04N 1/60* (2006.01)

(52) U.S. Cl.
CPC ............. *H04N 1/6027* (2013.01); *H04N 1/407* (2013.01); *H04N 1/6066* (2013.01)

(58) Field of Classification Search
None
See application file for complete search history.

(56) References Cited

U.S. PATENT DOCUMENTS

| | | | | |
|---|---|---|---|---|
| 5,760,913 A * | 6/1998 | Falk | ............................... | 382/167 |
| 6,804,025 B1 * | 10/2004 | Ueda | .................... | H04N 1/6033 358/1.9 |
| 7,483,187 B2 * | 1/2009 | Bochkarev | ........... | H04N 1/6011 358/1.9 |
| 7,499,202 B2 * | 3/2009 | Ono | ..................... | H04N 1/6033 358/1.9 |
| 7,679,781 B2 * | 3/2010 | Shibuya et al. | ................. | 358/1.9 |
| 8,179,576 B2 * | 5/2012 | Hayashi | ......................... | 358/520 |
| 8,243,335 B2 * | 8/2012 | Nagai | ........................... | 358/3.07 |
| 8,619,322 B2 | 12/2013 | Nagai | | |
| 8,665,492 B2 * | 3/2014 | Toriyabe | ............ | H04N 1/00002 358/1.9 |
| 8,767,266 B2 | 7/2014 | Nagai | | |
| 8,830,509 B2 | 9/2014 | Muramatsu | | |
| 8,849,028 B2 * | 9/2014 | Bryant | ................... | H04N 1/407 382/167 |
| 9,176,448 B2 * | 11/2015 | Kobayashi | ......... | G03G 15/5058 |
| 2007/0139676 A1 * | 6/2007 | Shimada | ............ | H04N 1/40012 358/1.9 |
| 2010/0231936 A1 | 9/2010 | Nagai | | |
| 2012/0236332 A1 * | 9/2012 | Yamazaki | .......... | H04N 1/00482 358/1.9 |
| 2012/0300234 A1 * | 11/2012 | Muramatsu | .................... | 358/1.9 |

FOREIGN PATENT DOCUMENTS

JP 2012-247924 A 12/2012

* cited by examiner

*Primary Examiner* — Scott A Rogers
(74) *Attorney, Agent, or Firm* — Fitzpatrick, Cella, Harper & Scinto

(57) ABSTRACT

In a case where density adjustment is performed on a plurality of density ranges, adjustment setting values of adjacent density ranges affect one another, and therefore, tone reversal occurs depending on adjustment setting values. Consequently, control points to be used are determined in accordance with a combination of density ranges to be adjusted of the plurality of density ranges. Further, a density level at an intermediate point in a density range to be adjusted is adjusted based on an adjustment level of the density range to be adjusted. Then, by performing interpolation between the control points to be used including an intermediate point whose density level is adjusted, density characteristics data indicative of density characteristics is generated and then density adjustment of image data is performed.

16 Claims, 16 Drawing Sheets

CONTROL POINT SELECTION TABLE

| DENSITY RANGE TO BE ADJUSTED | | | CONTROL POINTS TO BE USED | | | | | | | | |
|---|---|---|---|---|---|---|---|---|---|---|---|
| LOW DENSITY RANGE | INTER-MEDIATE DENSITY RANGE | HIGH DENSITY RANGE | LOW DENSITY RANGE START POINT | LOW DENSITY RANGE INTER-MEDIATE POINT | INTER-MEDIATE DENSITY RANGE START POINT | LOW DENSITY RANGE END POINT | INTER-MEDIATE DENSITY RANGE INTER-MEDIATE POINT | HIGH DENSITY RANGE START POINT | INTER-MEDIATE DENSITY RANGE END POINT | HIGH DENSITY RANGE INTER-MEDIATE POINT | HIGH DENSITY RANGE END POINT |
| ○ | | | ● | | | | | | | | ● |
| | ○ | | ● | ● | | ● | | | | | ● |
| | | ○ | ● | | ● | | | | | | ● |
| ○ | ○ | | ● | ● | | ● | ● | ● | ● | | ● |
| ○ | ○ | ○ | ● | ● | ● | | ● | ● | ● | ● | ● |
| | ○ | ○ | ● | | | | ● | | | ● | ● |
| ○ | | ○ | ● | ● | | | ● | | | ● | ● |

FIG.14A

INTERMEDIATE POINT ADJUSTMENT TABLE

| ADJUSTMENT LEVEL | | LOW DENSITY RANGE INTERMEDIATE POINT | INTERMEDIATE DENSITY RANGE INTERMEDIATE POINT | HIGH DENSITY RANGE INTERMEDIATE POINT |
|---|---|---|---|---|
| DARK ↔ BRIGHT | +2 | 85 | 158 | 240 |
| | +1 | 64 | 144 | 224 |
| | 0 | 50 | 130 | 208 |
| | −1 | 35 | 116 | 186 |
| | −2 | 20 | 100 | 168 |

FIG.14B

INTERMEDIATE POINT ADJUSTMENT TABLE

| ADJUSTMENT LEVEL | | LOW DENSITY RANGE INTERMEDIATE POINT | INTERMEDIATE DENSITY RANGE INTERMEDIATE POINT | HIGH DENSITY RANGE INTERMEDIATE POINT | HIGH DENSITY RANGE END POINT |
|---|---|---|---|---|---|
| DARK ↔ BRIGHT | +2 | 85 | 158 | 240 | 255 |
| | +1 | 64 | 144 | 224 | 255 |
| | 0 | 50 | 130 | 208 | 255 |
| | −1 | 35 | 116 | 186 | 232 |
| | −2 | 20 | 100 | 168 | 212 |

FIG.15

FIG.16A — CONTROL POINT SELECTION TABLE

| DENSITY RANGE TO BE ADJUSTED | | | CONTROL POINTS TO BE USED | | | | | | | | | | |
|---|---|---|---|---|---|---|---|---|---|---|---|---|---|
| LOW DENSITY RANGE | INTER-MEDIATE DENSITY RANGE | HIGH DENSITY RANGE | LOW DENSITY RANGE START POINT | LOW DENSITY RANGE AUX-ILIARY POINT | LOW DENSITY RANGE INTER-MEDIATE POINT | INTER-MEDIATE DENSITY RANGE START POINT | LOW DENSITY RANGE END POINT | INTER-MEDIATE DENSITY RANGE INTER-MEDIATE POINT | HIGH DENSITY RANGE START POINT | INTER-MEDIATE DENSITY RANGE END POINT | HIGH DENSITY RANGE INTER-MEDIATE POINT | HIGH DENSITY RANGE AUX-ILIARY POINT | HIGH DENSITY RANGE END POINT |
| ○ | | | ● | | | | | | | | | | ● |
| | ○ | | ● | ● | | | | | | | | | ● |
| ○ | ○ | | ● | ● | ● | ● | ● | | | | | | ● |
| | ○ | | ● | ● | ● | | | ● | | | | | ● |
| ○ | ○ | ○ | ● | ● | ● | ● | ● | ● | ● | ● | ● | ● | ● |
| | ○ | ○ | ● | | | | | ● | | ● | ● | ● | ● |
| | | ○ | ● | | | | | | | | ● | ● | ● |

FIG.16B — INTERMEDIATE POINT ADJUSTMENT TABLE

| ADJUSTMENT LEVEL | | LOW DENSITY RANGE AUXILIARY POINT | LOW DENSITY RANGE INTERMEDIATE POINT | INTERMEDIATE DENSITY RANGE INTERMEDIATE POINT | HIGH DENSITY RANGE INTERMEDIATE POINT | HIGH DENSITY RANGE AUXILIARY POINT |
|---|---|---|---|---|---|---|
| DARK ← | +2 | 36 | 85 | 158 | 240 | 253 |
| | +1 | 26 | 64 | 144 | 224 | 248 |
| | 0 | 18 | 50 | 130 | 208 | 239 |
| | -1 | 10 | 35 | 116 | 186 | 228 |
| → BRIGHT | -2 | 4 | 20 | 100 | 168 | 220 |

… # IMAGE PROCESSING APPARATUS AND METHOD PERFORMING DENSITY ADJUSTMENT ON IMAGE DATA BASED ON GENERATED DENSITY CHARACTERISTICS DATA

BACKGROUND OF THE INVENTION

1. Field of the Invention

The present invention relates to an image processing apparatus and an image processing method for performing density adjustment processing on image data.

2. Description of the Related Art

At the time of outputting digital data created on a computer by a printer or a multifunction peripheral (hereinafter, called "MFP"), a density adjustment function is utilized in order to adjust the density characteristics of an output.

The density adjustment function includes uniform adjustment performed by changing the inclination of the density characteristics for each input color signal and adjustment by density range in which adjustment is performed independently for each density range on a plurality of density ranges. In the adjustment by density range, the density is adjusted independently for each color and each density range by dividing the density range into a low range and a high range for each color signal besides the entire density range, and this method is effective to achieve improvement in the degree of freedom of the adjustment by a user.

At the time of performing density adjustment on a plurality of density ranges, there is a case where tone reversal occurs in adjacent density ranges depending on the adjustment setting values. The reason for this is that the adjustment setting values in adjacent density ranges affect one another. Japanese Patent Laid-Open No. 2012-247924 describes the technique to prevent reversal of density by monotonically increasing the output density value for the density portion where density is reversed so as to prevent the reversal of density from occurring in the adjacent density ranges.

However, in the prior art, a detection processing to detect whether reversal has occurred in the adjustment characteristics is interposed, and therefore, there is such a problem that the processing becomes complicated.

The present invention provides an image processing apparatus and an image processing method capable of easily implementing preservation of tone properties by a simple configuration at the time of performing density adjustment independently on a plurality of density ranges.

SUMMARY OF THE INVENTION

The image processing apparatus according to the present invention is an image processing apparatus capable of performing density adjustment on a plurality of density ranges, including: a determination unit configured to determine control points to be used in accordance with a combination of density ranges to be adjusted of the plurality of density ranges; an adjustment unit configured to adjust a density level at an intermediate point in the density range to be adjusted based on an adjustment level of the density range to be adjusted; a generation unit configured to generate density characteristics data indicative of density characteristics by performing interpolation between the control points to be used determined by the determination unit including an intermediate point whose density level is adjusted by the adjustment unit; and a control unit configured to perform density adjustment on image data based on the density characteristics data generated by the generation unit.

According to the present invention, it is made possible to easily implement preservation of tone properties by a simple configuration at the time of performing density adjustment independently on a plurality of density ranges.

Further features of the present invention will become apparent from the following description of exemplary embodiments (with reference to the attached drawings).

BRIEF DESCRIPTION OF THE DRAWINGS

FIG. 14A is a diagram showing a control point selection table in a first embodiment;

FIG. 14B is a diagram showing a control point selection table in a first embodiment;

FIG. 15 is a diagram showing a control point selection table in a first embodiment;

FIG. 16A is a diagram showing a control point selection table in a second embodiment; and FIG. 16B is a diagram showing a control point selection table in a second embodiment.

DESCRIPTION OF THE EMBODIMENTS

Hereinafter, embodiments for embodying the present invention are explained by use of drawings.

First Embodiment

In the present embodiment, explanation is given by using an MFP having a color scanner as an image processing apparatus.

Figure 1:
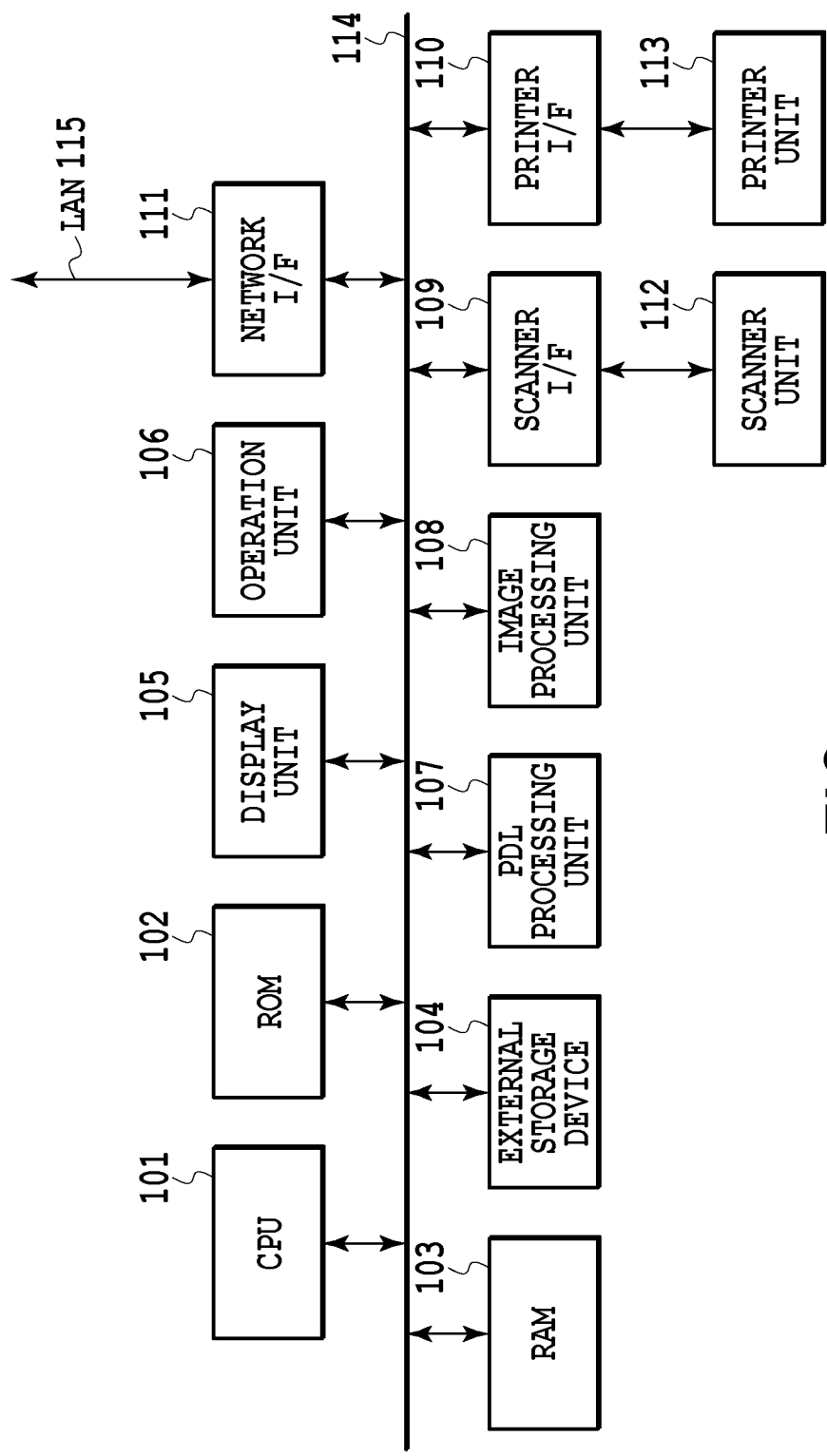
FIG. 1 is a block diagram for explaining a controller configuration example of an image processing apparatus.

FIG. 1 is a block diagram for explaining a controller configuration of the image processing apparatus of the present embodiment. The controller is electrically connected with a scanner unit 112 and a printer unit 113 and connected with a network via a LAN 115. With this configuration, it is made possible to input and output image data and device information.

A CPU 101 is a central processing unit that performs control of the whole of the image processing apparatus, arithmetic operation processing, etc., and performs each process, to be described and shown later, based on programs stored in a ROM 102. The ROM 102 is a read-only memory and a storage area of activation programs to activate the image processing apparatus, programs for performing control of a printer engine, etc.

A RAM 103 is a random access memory and is a system work memory for the CPU 101 to operate, and programs and data are loaded thereon for each of various processes and then executed. It is also possible to utilize the RAM 103 as a data storage area of received image data. An external storage device 104 includes, for example, a hard disc etc. and in which data is spooled, programs, each information file, and image data are stored, and which is utilized as a work area.

A display unit 105 produces a display by, for example, liquid crystal etc. and is used to display a setting state of the apparatus, the current processing inside the apparatus, an error state, etc. An operation unit 106 is used to change or reset settings and it is also possible to display an operation screen etc. for printing settings at the time of output, such as density adjustment settings, together with the display unit 105.

A network interface 111 is an interface for connecting the image processing apparatus to a network. A system bus 114 is intended to serve as a data path between the above-described components.

Next, processing to receive a rendering command transmitted from a host computer via a network and to perform printing is explained. Applications that run on the host computer create a page layout document, a word processor document, a graphic document, etc. These applications transmit created digital document data to a printer driver and the printer driver generates a rendering command based on the digital document data. As the rendering command generated here, the page description language called PDL for creating page image data is common. Normally, the rendering command includes a rendering instruction of data, such as images, graphics, and text. The generated rendering command described above is transferred to the image processing apparatus via the network I/F 111.

The rendering command transmitted from the host computer is subjected to analysis processing in a PDL processing unit 107 and thereby a rendered object is generated and further rasterize processing is performed and thereby bitmap image data is generated. Next, the generated bitmap image data is converted into an image format that can be transferred to the printing unit 113 in an image processing unit 108. In a case where printing settings, such as density adjustment, are done in the host computer or the operation unit 106, the image processing unit 108 performs image processing reflecting the settings. By transferring the image data thus generated to the printing unit 113 via a printer I/F 110, an image is output on the surface of paper. By the processing as explained above, the PDL print processing to print an image by using the rendering command from the host computer is completed.

Next, processing to print a bitmap image input from the scanner unit 112 is explained. The scanner unit 112 reads a bitmap image by optically scanning an image printed on paper or film, measuring the intensity of reflected light and transmitted light, and carrying out analog-digital conversion. The bitmap image obtained here is commonly an RGB image.

The bitmap image transferred from the above-described scanner unit 112 is converted into an image format that can be transferred to the printer unit 113 in the image processing unit 108. At this time also, in a case where printing settings, such as density adjustment, are done in the operation unit 106, the image processing unit 108 performs image processing reflecting the settings. By transferring the image data thus generated to the printer unit 113 via the printer I/F 110, an image is output onto the surface of paper. By the processing explained above, the copy processing to print the bitmap image input from the image input device, such as a scanner, is completed.

Next, details of the processing performed in the image processing unit 108 are explained.

Figure 2:
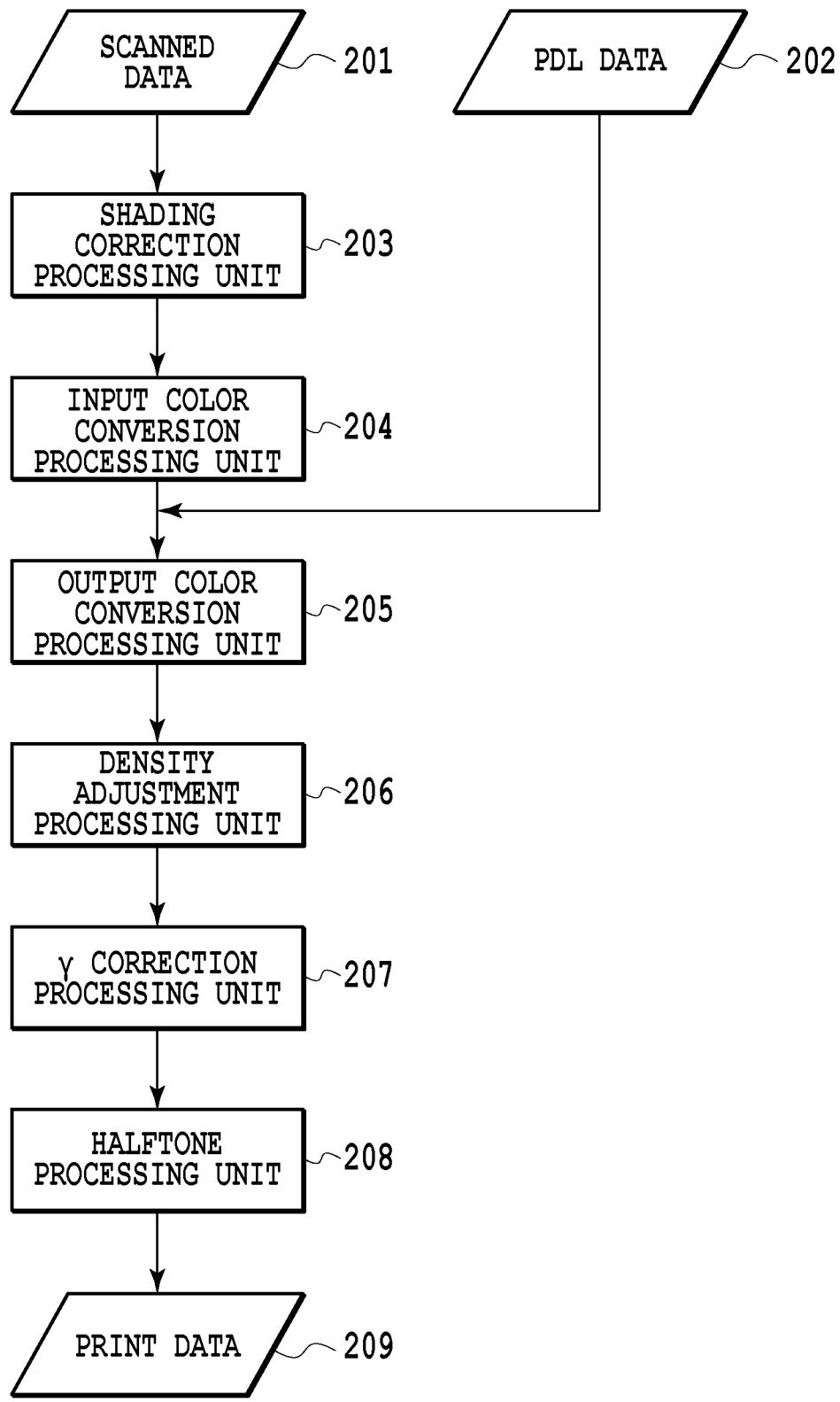
FIG. 2 is a block diagram for explaining an outline of the operation of processing by an image processing unit.

FIG. 2 is a block diagram for explaining an outline of the operation of the copy processing and PDL print processing by the image processing unit 108. The image processing unit 108 has a block peculiar to the copy processing and a block common to the copy processing and the PDL print processing.

First, the block peculiar to the copy processing is explained. At the time of copy processing, a shading correction processing unit 203 performs shading correction on multivalued image data (scanned data 201) read by the scanner unit 112. An input color conversion processing unit 204 performs, on the corrected image data, conversion from the color space peculiar to the scanner into the common RGB color space. In the present embodiment, the present color space conversion is performed by an arithmetic operation by a 3×3 matrix defined in advance.

Here, the operation in a case where the input to the printer unit 113 is image data corresponding to developers in four colors, i.e., cyan (C), magenta (M), yellow (Y), and black (K) is described.

Processing to be explained in the following is processing common to the copy processing and the PDL print processing. An output color conversion processing unit 205 converts the input bitmap image in the common RGB color space into density image data in the CMYK color space by using a lookup table (LUT) etc. The density image data generated here will be CMYK data that takes levels of multiple values in each pixel. Naturally, the density image data may not be CMYK data depending on the type of the developer.

A density adjustment processing unit 206 adjusts the density characteristics of the density image data generated as described above by reflecting the settings of the density adjustment in accordance with necessity. Normally, adjustment is performed by generating density characteristics data indicative of density characteristics and based on the density characteristics data and the density image data. As the density characteristics data, for example, a 1D-LUT called a density adjustment table is used. Details of the processing of the density adjustment processing unit 206 will be described later.

Next, a γ (gamma) correction processing unit 207 corrects the density tone of the density image data in accordance with the output density tone characteristics of the printer unit 113 and sends the corrected density image data to a halftone processing unit 208.

Normally, it is frequent that the printer unit 113 is capable of producing an output only with a small number of tones, such as 2, 4, and 16 tones. Consequently, halftone processing is performed in the halftone processing unit 208 so that it is possible to enable stable halftone representation also in the printer unit 113 capable of producing only an output with a small number of tones. The halftone processing unit 208 performs halftone processing on the density image data and converts the density image data into print data, which is a halftone image. The halftone processing unit 208 transfers print data 209 to the printer unit 113 via the printer I/F 110 and the printer unit 113 performs print processing.

Next, PDL print processing is explained. At the time of PDL print processing, the image processing unit 108 receives image data, which is obtained by the PDL processing unit 107 rasterizing PDL data 202, and performs processing. At the time of PDL print processing, the processing on the image read by the scanner, i.e., the shading correction processing and the input color conversion processing are not necessary, and therefore, the processing in these processing blocks is not performed.

The image processing unit 108 transfers the print data 209 output by performing the processing in the output color conversion processing unit 205 and the subsequent units to the printer unit 113 and the printer unit 113 performs print processing.

Next, details of the processing of the density adjustment processing unit 206 are explained. First, by using FIG. 3, FIG. 4, and FIGS. 5A to 5F, an outline of the processing of adjustment by density range is explained.

Figure 3:
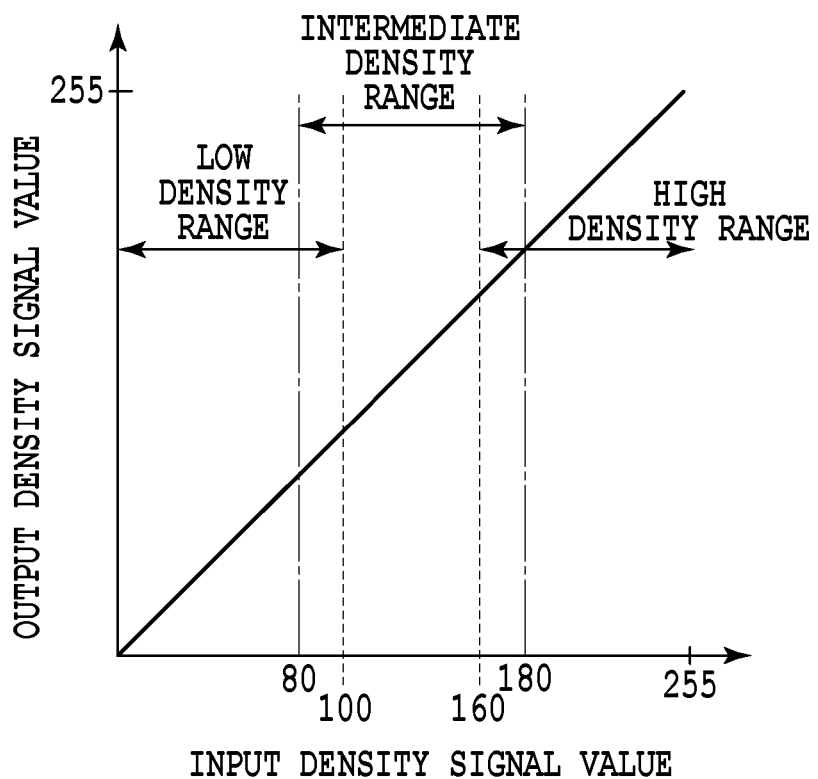
FIG. 3 is a diagram showing an example of a density adjustment table created in a density adjustment processing unit.

FIG. 3 is a diagram showing an example of the density adjustment table created in the density adjustment processing unit 206. The density adjustment table will be a table in which input density signal values are associated with output density signal values. In the present example, by dividing the input density signal value axis, the range is divided into three ranges: low, intermediate, and high density ranges. In a case where the input/output density signal value is assumed to be represented by eight bits, each density range is set, for example, as follows: the low density range is between 0 and 100, the intermediate density is between 80 and 180, and the high density range is between 160 and 255. The number of divisions and the range of each density range are not limited to those. Further, in the density adjustment table in FIG. 3, the low density range and the intermediate density range overlap partially and the intermediate density range and the high density range overlap partially. In other words, an example in which adjacent density ranges overlap is shown.

Figure 4:
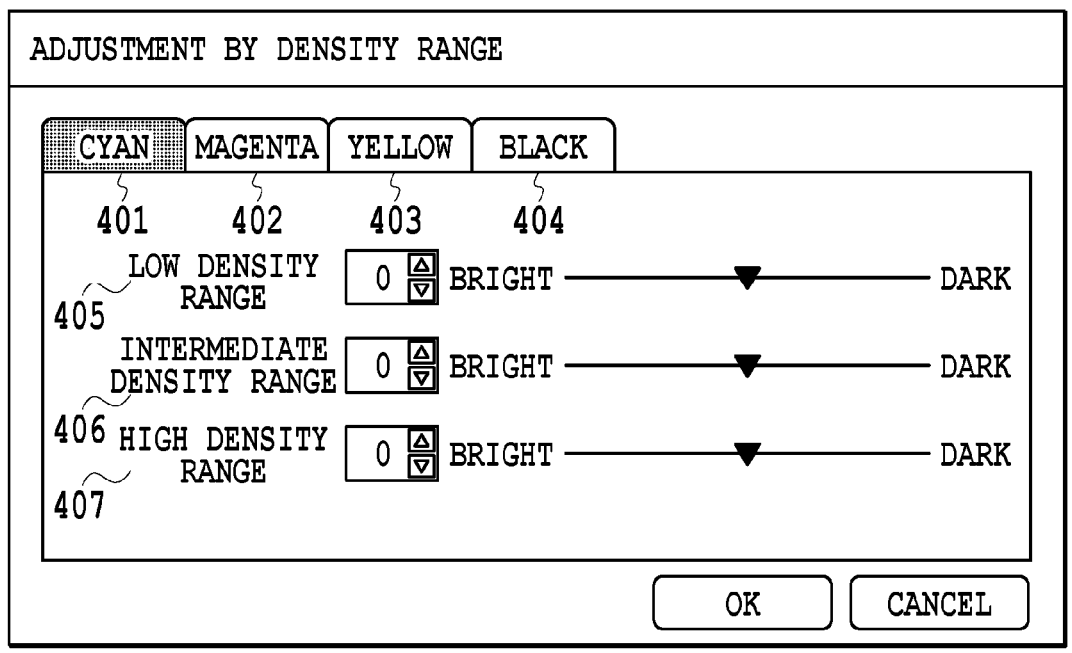
FIG. 4 is a diagram showing an example of an adjustment screen of processing of adjustment by density range.

FIG. 4 is an example of an adjustment screen of the processing of adjustment by density range displayed by the monitor of the host computer or the operation unit 106. For each of C, M, Y, and K, the adjustment screen is provided separately as tabs 401, 402, 403, and 404. Only K is necessary in a case of a monochrome device. In the present example, the adjustment screen for C is displayed and for each of a low density range 405, an intermediate density range 406, and a high density range 407, it is possible to select an appropriate level from among adjustment levels in several steps from "Bright" to "Dark".

Figure 5A:
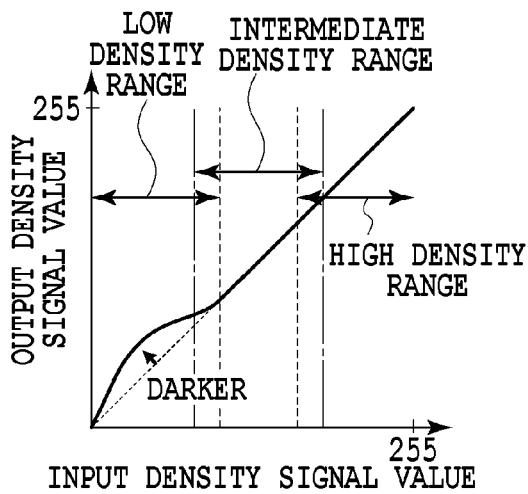
FIGS. 5A to 5F are diagrams each for explaining an outline of the processing of adjustment by density range.
Figure 5B:
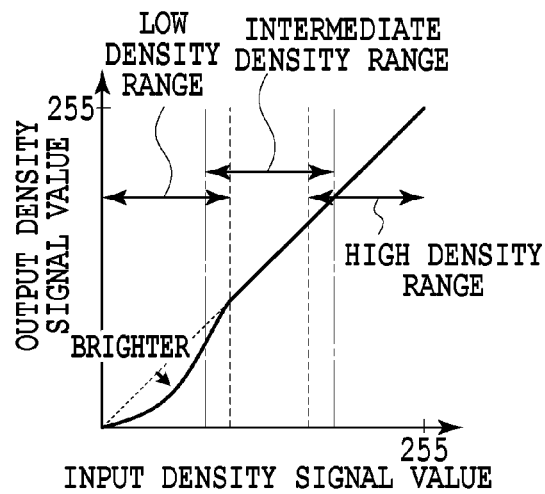

FIG. 5A to FIG. 5F are diagrams each showing an example of the density adjustment table in a case where each density range is adjusted. FIG. 5A shows the density adjustment table in a case where the adjustment value of the low density range is adjusted in the "Dark" direction and FIG. 5B shows the density adjustment table in a case where the adjustment value of the low density range is adjusted in the "Bright" direction.

Figure 5C:
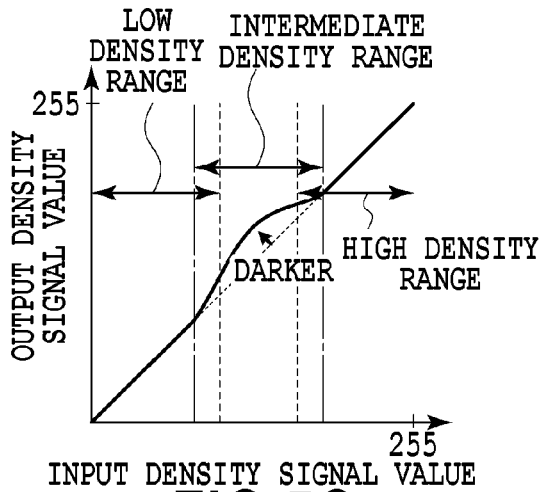
Figure 5D:
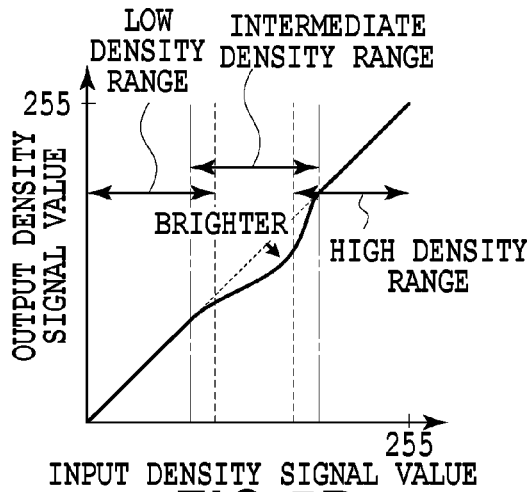
Figure 5E:
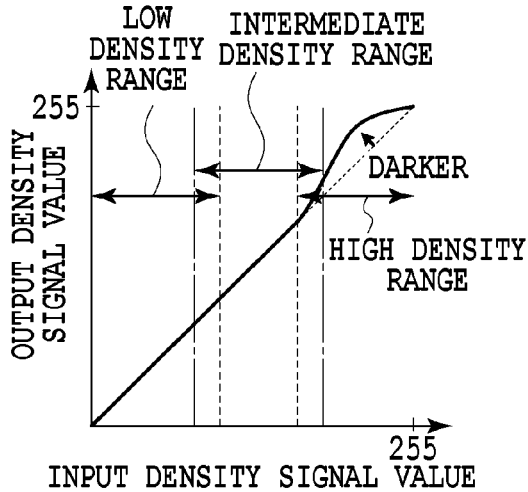
Figure 5F:
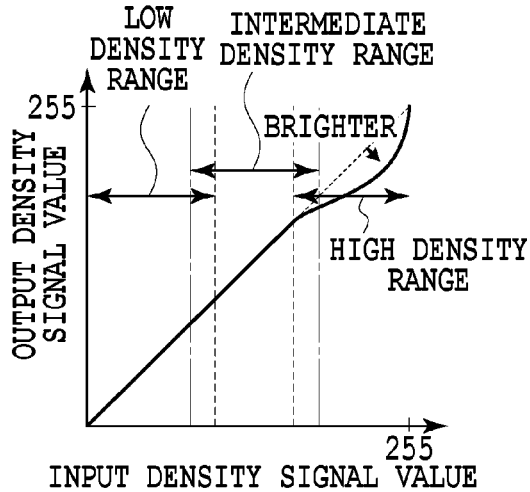

Similarly, FIG. 5C shows the density adjustment table in a case where the adjustment value of the intermediate density range is adjusted in the "Dark" direction and FIG. 5D shows the density adjustment table in a case where the adjustment value of the intermediate density range is adjusted in the "Bright" direction. Further, FIG. 5E shows the density adjustment table in a case where the adjustment value of the high density range is adjusted in the "Dark" direction and FIG. 5F shows the density adjustment table in a case where the adjustment value of the high density range is adjusted in the "Bright" direction.

Such adjustment like this is performed for each of C, M, Y, and K and the adjustment processing is performed by the density adjustment processing unit 206 applying the created density adjustment table to the density image data.

For the adjustment level, two steps are set in the "Dark" direction and in the "Bright" direction, respectively, and the higher the level becomes, the higher the degree of the adjustment curve becomes and as zero is approached, the adjustment curve becomes closer to a straight line.

Hereinafter, the method for creating the density adjustment table in the density adjustment processing unit 206 is explained. In the present embodiment, density adjustment is performed by using control points for each density range. Further, the control points are selectively used according to a combination of the density ranges to be adjusted.

Figure 6:
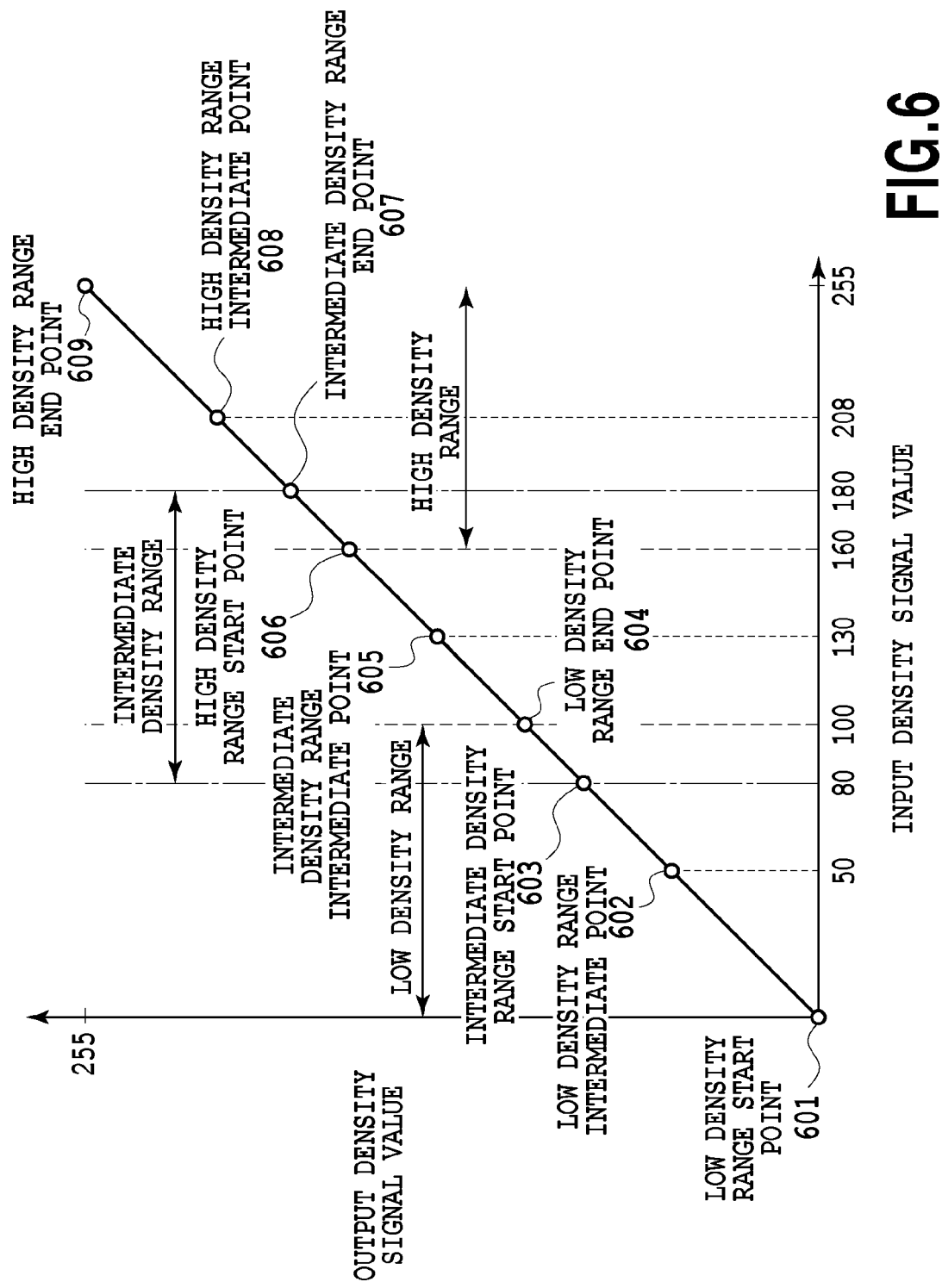
FIG. 6 is a diagram showing an example of control points to be used at the time of density adjustment table creation.

FIG. 6 shows an example of control points of density adjustment used at the time of density adjustment table creation in the present embodiment.

In the present example, the start point, the intermediate point, and the end point are set for each of the low, intermediate, and high density ranges. In other words, the start point, the intermediate point, and the end point in the low density range are denoted by 601, 602, and 604, respectively. The start point, the intermediate point, and the endpoint in the intermediate density range are denoted by 603, 605, and 607, respectively, and the start point, the intermediate point, and the endpoint in the high density range are denoted by 606, 608, and 609, respectively. In the present embodiment, the start point, the intermediate point, and the end point in each density range are generally referred to as the control points. The intermediate point in each density range is the point between the start point and the end point in each density range and is not necessarily the midpoint between the start point and the end point. In the present embodiment, in a case where the adjustment of the density level is performed, the adjustment of the density level at the intermediate point in each density range is performed as a result. In other words, in the present embodiment, the adjustment of the density level is not performed for the start point and the end point in each density range of the control points. Hereinafter, explanation is given by using a more detailed example.

FIG. 14A is a control point selection table showing combinations of control points (control points to be used) used to create a density adjustment table in a case where settings are input through the adjustment screen of the processing of adjustment by density range as shown in FIG. 4. The control point selection table as shown in FIG. 14A is set in advance and read temporarily onto the RAM 103 at the time of creating the density adjustment table.

In a case where adjustment is performed, for example, only on the intermediate density range, in accordance with the control point selection table, the control points to be used are the low density range start point 601, the intermediate density range start point 603, the intermediate density range intermediate point 605, the intermediate density range end point 607, and the high density range end point 609. On the other hand, in a case where the adjustment of the low density range and the intermediate density range is performed, the control points to be used are the low density range start point 601, the low density range intermediate point 602, the intermediate density range intermediate point 605, the intermediate density range endpoint 607, and the high density range end point 609. In this manner, the control point selection table specifies that in a case where, for example, the adjustment of the single density range is performed, the start point, the intermediate point, and the end point in the corresponding density range and the low density range start point and the high density range end point, which serve as the start point and the end point in the entire density range, respectively, are selected as control points to be used.

On the other hand, in a case where the adjustment of a plurality of adjacent density ranges is performed, the density ranges to be adjusted are regarded as a single density range. Then, the control point selection table specifies that the start point and the end point in the density range to be adjusted, which is regarded as a single range, the intermediate point included in the density range to be adjusted, and the low density range start point and the high density range end point, which serve as the start point and the end point in the entire density range, respectively, are selected as control points to be used. For example, in a case where the adjustment of the low density range and the intermediate density range is performed, the low density range and the intermediate density range are regarded as a single density range. Then, the low density range start point 601 and the intermediate density range end point 607 are selected, which are the start point and the endpoint in the single density range, respectively. Further, the low density range intermediate point 602 and the intermediate density range intermediate point 605 are selected, which are each the intermediate point in each density range included in the single density range. Then, the low density range start point 601 and the high density range endpoint 609, which serve as the start point and the end point in the entire density range, are selected, respectively. As shown in the present example, there also exists a point that is selected in an overlapping manner like the low density range start point 601.

Although not shown in FIG. 14A, it is possible for the control point selection table to include information for specifying the range of each density range.

FIG. 14B is an intermediate point adjustment table showing an example of the adjustment values at the intermediate point in each density range at the time of performing density adjustment. The intermediate point adjustment table as shown in FIG. 14B is set in advance and is read temporarily onto the RAM 103 at the time of creating the density adjustment table.

FIG. 14B shows an example in which two steps can be set in the "Dark (+)" direction and in the "Bright (−)" direction, respectively, for the adjustment level. Of course, the number of steps of the adjustment level and the adjustment values are not limited to those. In the example in FIG. 14B, for example, in a case where the adjustment level of the low density range intermediate point is set to +2, adjustment is performed so that an input signal value 50 (equivalent to the adjustment level 0) is output as an output signal value 85. In a case where the adjustment level is 0, density adjustment is not performed, and therefore, the point is not used as the control point. The intermediate point adjustment table shown in FIG. 14B may be a table common to all colors or a table in which individual settings are done for each color may be prepared.

Figure 7:
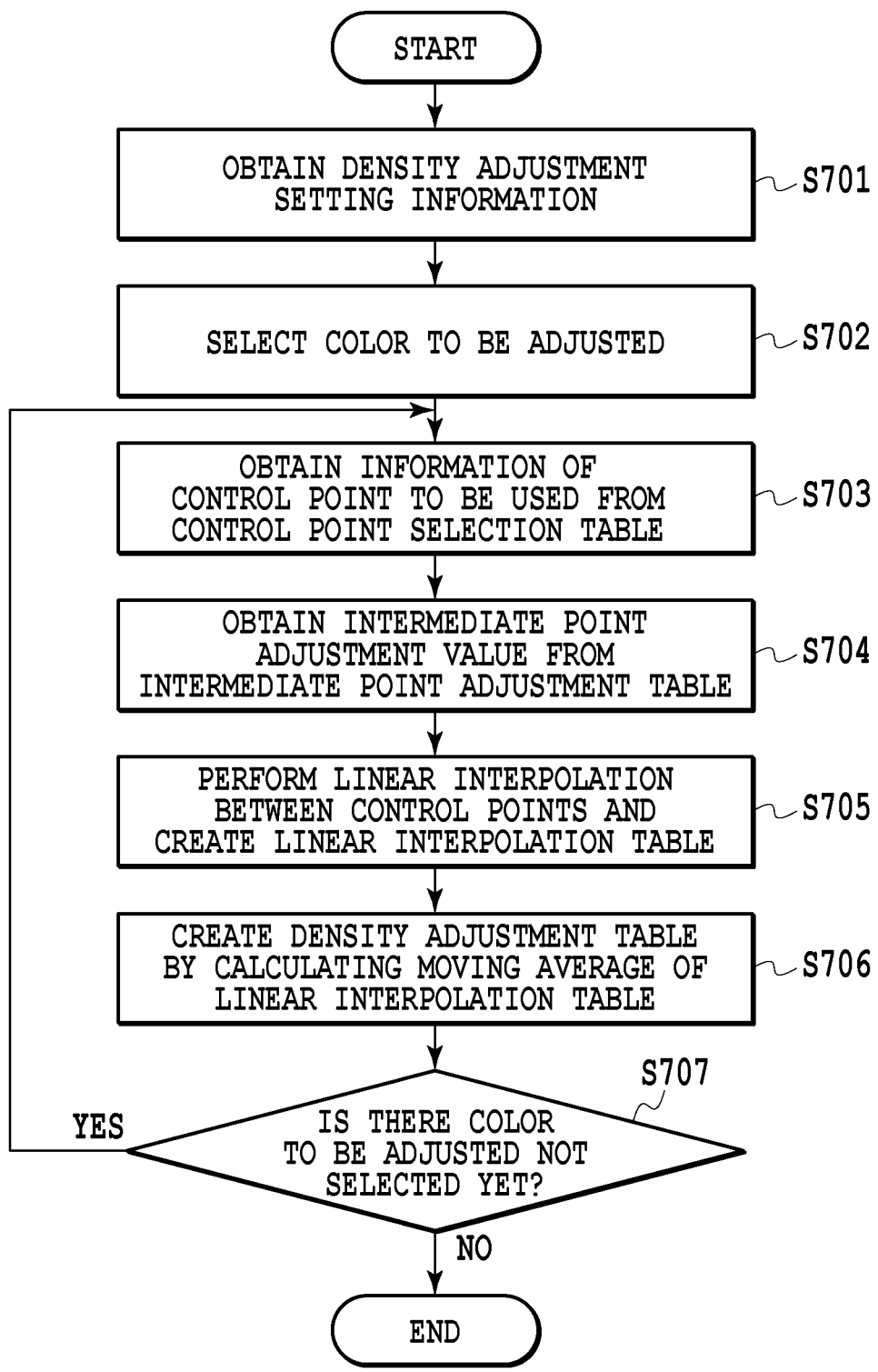
FIG. 7 is a flowchart showing an example of a procedure of creation processing of the density adjustment table.

FIG. 7 is a flowchart showing a procedure of the creation processing of the density adjustment table. In the following, the processing shown in the flowchart is realized by the CPU 101 executing programs stored in the ROM 102 and read temporarily onto the RAM 103.

First, at step S701, the density adjustment processing unit 206 obtains setting information of the density adjustment input from the operation unit 106. The setting information of the density adjustment obtained here is the information input from a user via the setting screen as shown in FIG. 4. The setting information of the density adjustment includes, for example, the color to be adjusted, the density range to be adjusted, and the adjustment level of the density range to be adjusted. The color to be adjusted is a color specified as an adjustment target. The density range to be adjusted is a density range specified as an adjustment target. As described previously, as the density range to be adjusted, a single density range may be specified, or a plurality of density ranges may be specified.

Next, at step S702, the density adjustment processing unit 206 selects a color to be adjusted that is not selected yet from the colors to be adjusted included in the setting information obtained at step S701. In the following, the processing from step S703 to step S706 is performed on the color to be adjusted selected at step S702.

Next, at step S703, the density adjustment processing unit 206 obtains information on the control points to be used that are used to create the density adjustment table from the control point selection table in FIG. 14A in accordance with the density range to be adjusted included in the setting information obtained at step S701.

At step S704, the density adjustment processing unit 206 obtains the adjustment value at the intermediate point in the density range to be used from the intermediate point adjustment table in FIG. 14B in accordance with the density range to be adjusted and the adjustment level included in the setting information obtained at step S701.

At step S705, the density adjustment processing unit 206 creates a linear interpolation table by performing linear interpolation between control points selected as the control points to be used at step S703 including the intermediate point whose density level is adjusted at step S704.

Finally, at step S705, the density adjustment processing unit 206 creates a density adjustment table by calculating a moving average for the liner interpolation table created at step S704.

The moving average is, for example, what is expressed by Equation (1) below. Here, linear interpolation table is expressed as f(x), the density adjustment table to be created as g(x), and the moving average width as w.

$$g(x) = f(x) \qquad 0 \leq x \leq w/2 \qquad \text{Equation (1)}$$

$$g(x) = \sum_{k=x-\frac{w}{2}}^{x+\frac{w}{2}} f(k)/w \quad w/2 < x \leq (255 - w/2)$$

$$g(x) = f(x) \qquad (255 - w/2) < x \leq 255$$

Figure 8A:
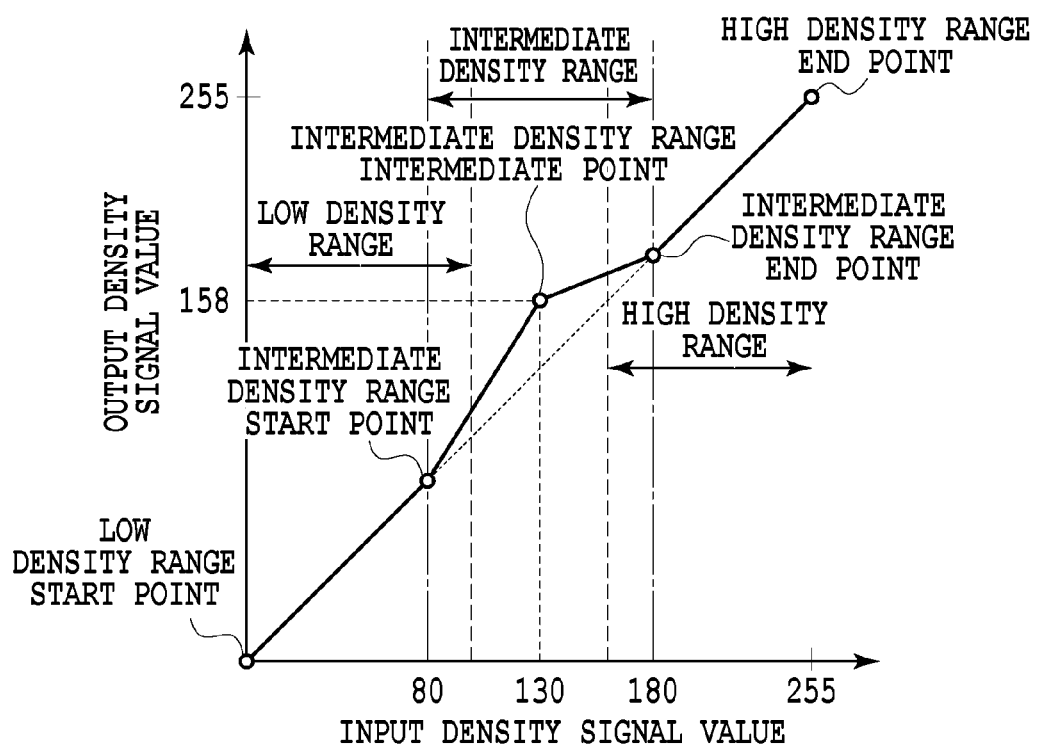
FIGS. 8A and 8B are diagrams each showing an outline of the density adjustment table creation.
Figure 8B:
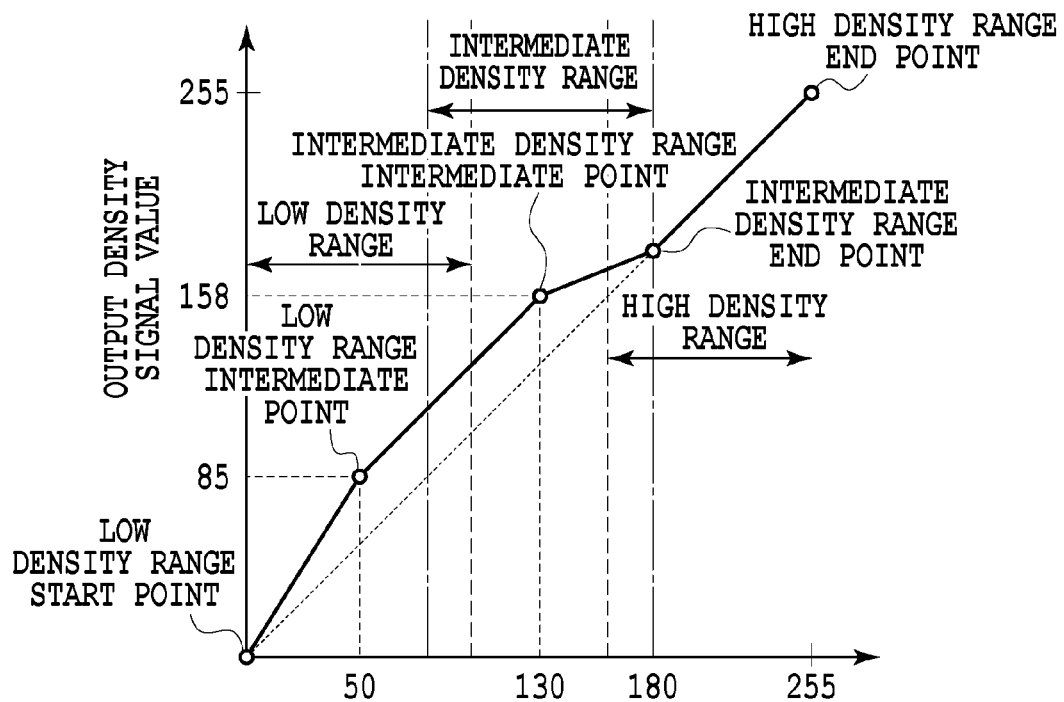

FIG. 8A and FIG. 8B each show an outline of density adjustment table creation in the present embodiment. FIG. 8A is an example of the linear interpolation table in a case where adjustment of +2 is performed with respect to the intermediate density range. Because of the adjustment of only the intermediate density range, the control points to be used are the low density range start point, the intermediate density range start point, the intermediate density range intermediate point, the intermediate density range end point, and the high density range end point in accordance with the control point selection table in FIG. 14A. Further, because of the adjustment of "+2", adjustment is performed so that an input signal value 130 is an output signal value 158 with respect to the intermediate density range intermediate point in accordance with the intermediate point adjustment table in FIG. 14B. By performing linear interpolation between control points, the linear interpolation table such as seen in FIG. 8A is created. On the other hand, FIG. 8B is an example of the linear interpolation table in a case where adjustment of "+2" is performed with respect to the low density range and the intermediate density range, respectively. Because of the adjustment of the low density range and the intermediate density range, the control points to be used are the low density range start point, the low density range intermediate point, the intermediate density range intermediate point, the intermediate density range end point, and the high density range end point in accordance with the control point selection table. Further, because of the adjustment of +2 for each, adjustment is performed so that an input signal value 50 is an output signal value 85 with respect to the low density range intermediate point and an input signal value 130 is an output signal value 158 with respect to the intermediate density range intermediate point in accordance with the intermediate point adjustment table. By performing linear interpolation between control points, the linear interpolation table such as seen in FIG. 8B is created.

At step S704, the linear interpolation table that serves as the base of the density adjustment table is created by performing linear interpolation between control points, but interpolation etc. using the Bezier curve can also be considered.

Next, returning to FIG. 7, explanation is continued. At step S707, the density adjustment processing unit 206 determines whether there is a color to be adjusted that is not selected yet. In a case where there is an unselected color to be adjusted, the density adjustment processing unit 206 performs the processing from step S703 to step S706 on the unselected color to be adjusted. In a case where there is no unselected color to be adjusted, the density adjustment processing unit 206 exits the processing.

In the above-described embodiment, the example is explained in which the adjustment of the density level is performed for the intermediate point in each density range. In other words, the example is explained in which adjustment is not performed with respect to the start point and the end point in each density range. Due to this, for example, as shown in FIG. 4, it is possible for a user to perform density adjustment by simple settings, such as specification of the density range to be adjusted and the density level thereof. Further, as described above, in the present embodiment, even in a case where the adjustment of the high density range is performed, adjustment is not performed with respect to the high density range end point. The reason for why adjustment is not performed with respect to the high density range end point is that, for example, consideration is taken so that there will be no influence of the halftone processing even in a case where the density adjustment of the high density range is performed in the "Bright" direction with respect to the character etc. to be rendered with the maximum input density signal value.

Figure 9:
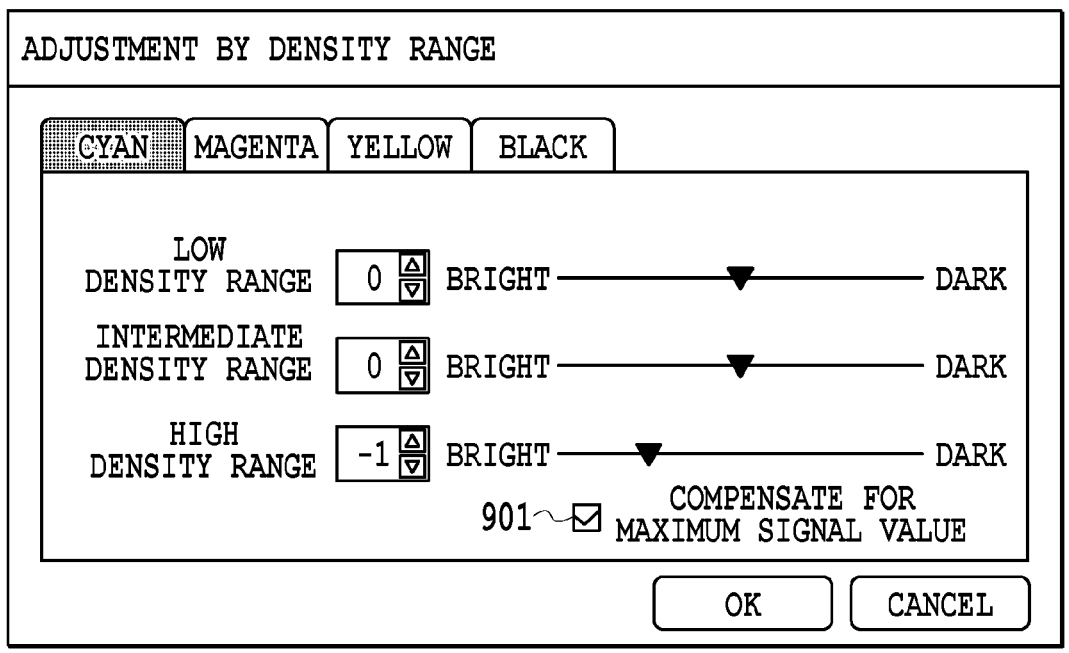
FIG. 9 is a diagram showing an example of an adjustment screen of the processing of adjustment by density range.

On the other hand, there can be considered a case where it is desired to reduce also the density of the image to be drawn with the maximum input density signal value as described above. FIG. 9 is an example of an adjustment screen of the adjustment by density range displayed by the operation unit 106 in the present embodiment, and also an example in which whether or not the rendering with the maximum input density signal value is compensated for can be selected. As shown by 901 in FIG. 9, whether or not the maximum signal value is compensated for is made selectable. In other words, in a case where the maximum input density signal value is compensated for, the adjustment of the high density range end point is not performed and in a case where the maximum input density signal value is not compensated for, the adjustment of the high density range end point is performed as a result. As to the adjustment of the high density range endpoint, it is made possible to easily perform adjustment by simultaneously setting the intermediate point and the end point in the setting of the adjustment level in the high density range.

FIG. 15 shows an example of the intermediate point adjustment table showing adjustment values at each intermediate point at the time of performing the adjustment at the high density range end point. FIG. 15 is an example in which the adjustment level of the high density range end point is added to the intermediate point adjustment table in FIG. 14B. The high density range end point is set so that the adjustment value is reduced in a case where a setting to reduce the density of the high density range is done.

Figure 10A:
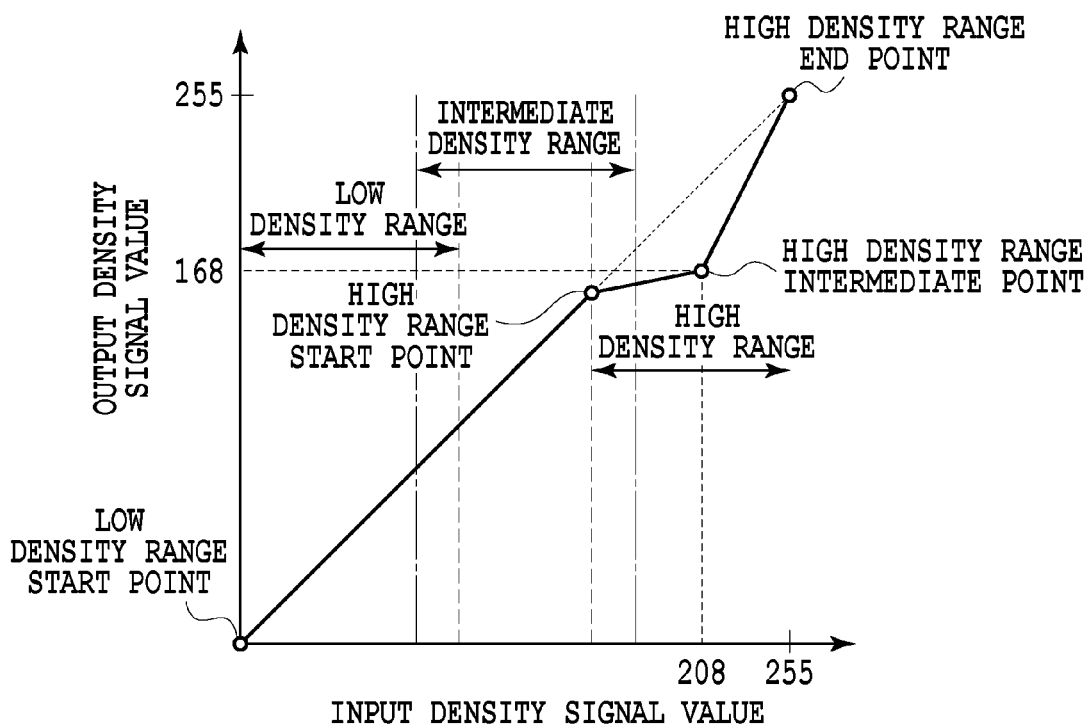
FIGS. 10A and 10B are diagrams each showing an outline of the density adjustment table creation.
Figure 10B:
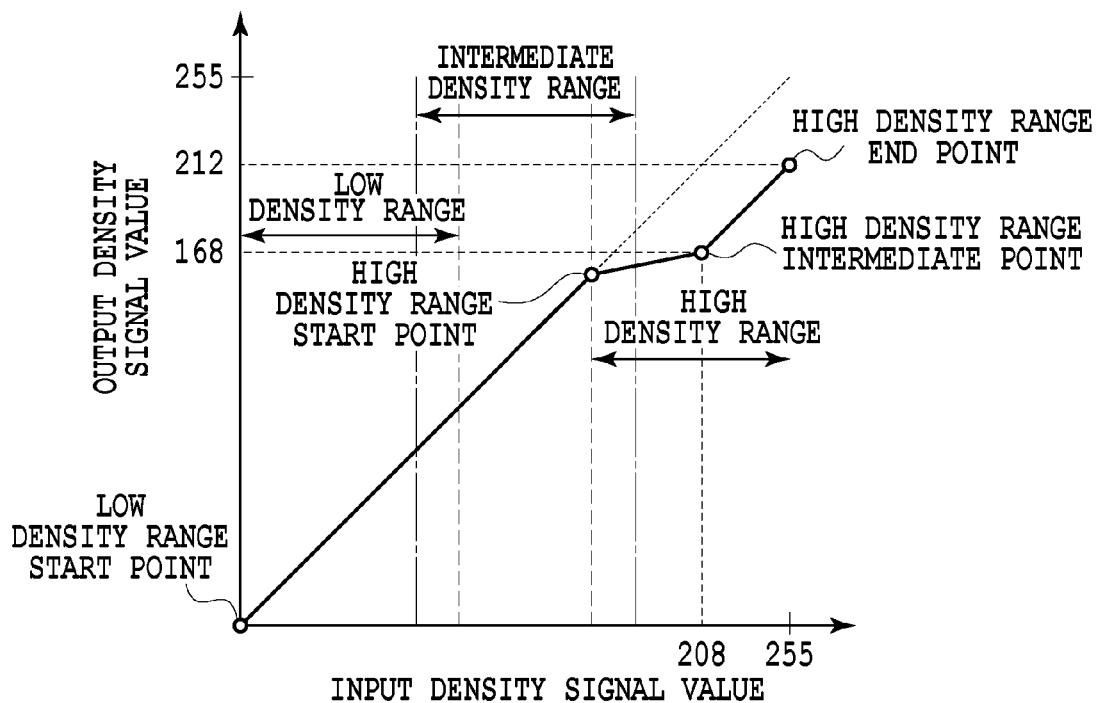

FIG. 10A and FIG. 10B each show an outline of density adjustment table creation in a case where the maximum input density signal value is compensated for and that in a case where the maximum input density signal value is not compensated for. FIG. 10A is the linear interpolation table in the case where the maximum input density signal value is compensated for, i.e., in a case where the adjustment at the high density range end point is not performed. On the other hand, FIG. 10B is the linear interpolation table in the case where the maximum input density signal value is not compensated for, i.e., in a case where the adjustment at the high density range end point is performed.

In the present embodiment, it is possible to suppress a step in tone that may occur in a case where adjacent adjustment setting values affect each other by selectively using control points and by performing linear interpolation between control points to be used. Further, in the present embodiment, the example is explained in which the adjacent density ranges overlap, but it is possible to set the control point that is not used depending on the combination of the density ranges. For example, in a case where two adjacent density ranges of the low density range and the intermediate density range are adjusted, the start point and the end point in the part where the two ranges overlap are not used. In other words, as described previously, the low density range and the intermediate density range are treated as a single density range, and therefore, the low density range end point and the intermediate density range start point are not selected as the control points to be used. Consequently, the present embodiment is effective even in a case where an overlap region exists or in a case where an overlap region does not exist. For example, in the present embodiment, the overlap region is provided by setting the low density range end point larger than the intermediate density range start point, but even in a case where the low density range end point is set smaller than the intermediate density range start point, the effectiveness of the present embodiment is not lost.

Providing an overlap region is equivalent to setting a large region for each density range compared to that in a case where no overlap region is provided. The larger the region of each density range, the greater the width in which adjustment can be performed becomes, and therefore, the level of representation of an image improves. Further, for example, in a case where no overlap region is provided, it is not possible to adjust the signal values corresponding to the low density range end point and the intermediate density range start point in the adjustment of the low density range, in the adjustment of the intermediate density range, or in the adjustment of the low density range and the intermediate density range. However, by providing an overlap region, it is also possible to adjust the signal values corresponding to the low density range end point and the intermediate density range start point in the adjustment of the low density range, in the adjustment of the intermediate density range, and in the adjustment of the low density range and the intermediate density range. Consequently, although there is an advantage in providing an overlap region, it is possible to apply the present embodiment even in a case where there is no overlap region as described previously.

Further, in the present embodiment, the output signal at the time of maximum adjustment at the intermediate point in the low density range is set to a value smaller than the output signal at the end point in the low density range (=input signal at the end point in the low density range) in the intermediate point adjustment table. In other words, the output signal at the maximum density level at the intermediate point in the lower density range of the adjacent density ranges is set to a value smaller than the output signal at the lower density range endpoint. Further, the output signal at the time of maximum adjustment at the intermediate point in the low density range is set to a value smaller than the output signal at the time of minimum adjustment at the intermediate point in the intermediate density range. In other words, the output signal at the maximum density level at the intermediate point in the lower density range of the adjacent density ranges is set to a value smaller than the output signal at the minimum density level at the intermediate point in the higher density range. By preparing such an intermediate point adjustment table, it is possible to easily suppress tone reversal from occurring. For example, in the present embodiment, the maximum adjustment output signal at the low density range control point is 85 from FIG. 14B, and this value is smaller than 100, which is the value of the output signal at the low density range end point (=input signal at the end point in the low density range). Further, 85 is smaller than 100, which is the value of the output signal at the time of minimum adjustment at the intermediate density range intermediate point. Because of this, control is performed so as to prevent tone reversal from occurring.

As the same control, by setting the output signal at the time of maximum adjustment at the intermediate density range intermediate point to a value smaller than the output signal at the intermediate density range end point (=input signal at the end point in the intermediate density range) and the output signal at the time of minimum adjustment at the high density range intermediate point, it is made possible to suppress tone reversal from occurring.

As above, according to the present embodiment, in a case where density adjustment is performed independently on a plurality of density ranges, the control points are set in each density range. Then, by selectively using the control points depending on the combination of the density ranges to be adjusted, it is made possible to implement suppression of density reversal and preservation of tone properties by a simple configuration. Further, in the present embodiment, by providing the control point selection table and the intermediate point adjustment table as described previously, tone reversal does not occur, and therefore, the processing to detect whether reversal has occurred is no longer necessary.

In the present embodiment, explanation is given by using the form of a table as an example, such as the control point selection table and the intermediate point adjustment table, but any form may be used as far as the density range to be adjusted and the adjustment value (density value) corresponding to the adjustment level are obtained.

Further, in the present embodiment, the example is explained in which the individual intermediate point in each density range is associated with the signal value of the intermediate value in the density range, but the signal value is not necessarily the intermediate value.

Second Embodiment

In the first embodiment, the example is explained in which the start point, the intermediate point, and the end point are set in each density range as the control points and at the time of density range adjustment, the control points are selectively used depending on the combination of the density ranges to be adjusted. In a second embodiment, an image processing apparatus is explained, which is capable of easily preserving tone properties in relation to the density adjustment of the density range for which a higher degree of tone reproducibility is required, such as a highlight part and a shadow part, by further adding the control points.

The controller configuration of the image processing apparatus according to the second embodiment is the same as that in the first embodiment shown in FIG. 1.

Figure 11:
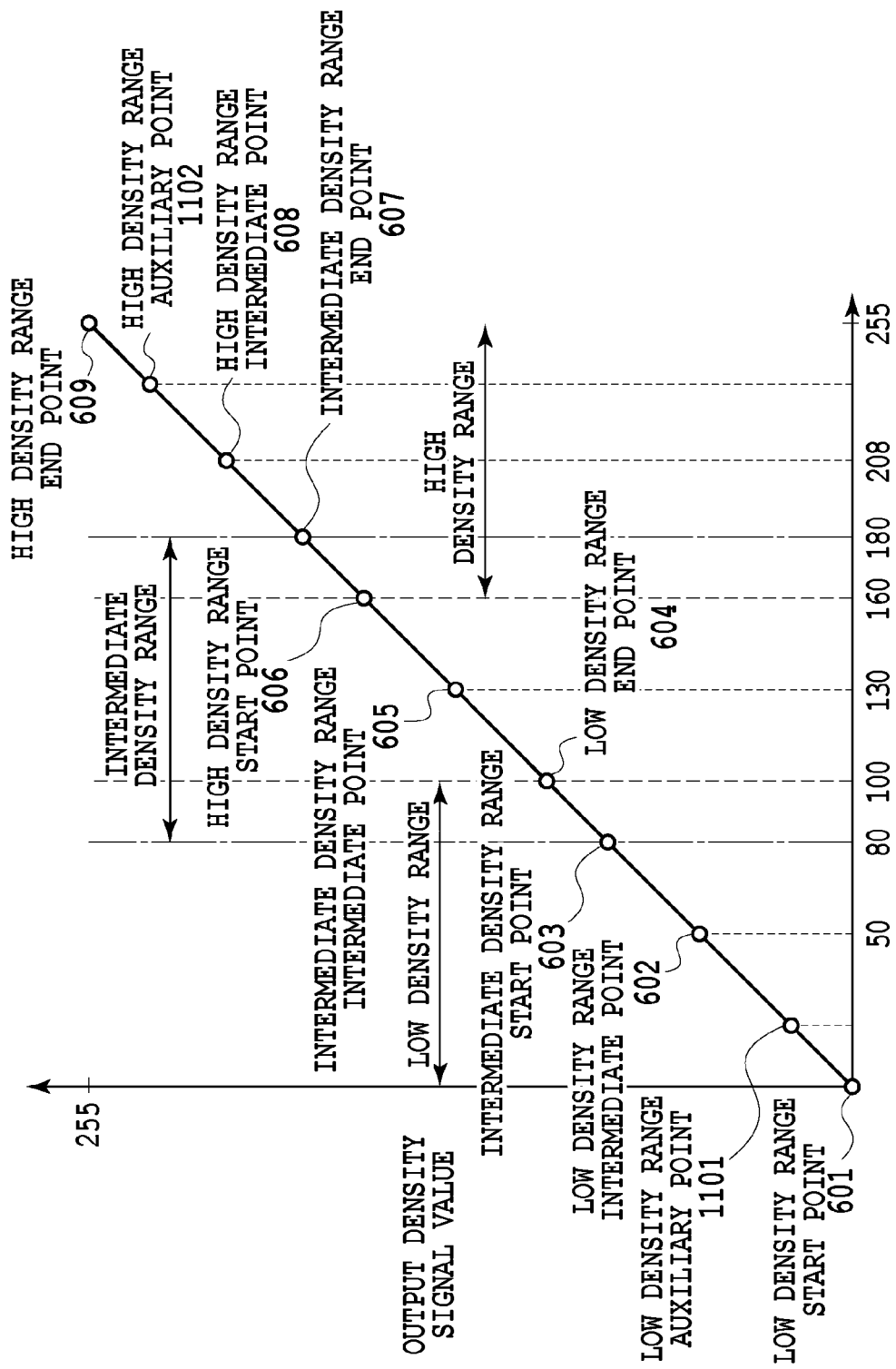
FIG. 11 is a diagram showing an example of control points to be used at the time of density adjustment table creation in a second embodiment.

FIG. 11 shows an example of control points of density adjustment used at the time of density adjustment table creation in the second embodiment. In FIG. 11, the control points set as the start point, the intermediate point, and the end point in each of the low, intermediate, and high density ranges are the same as those explained in FIG. 6 of the first embodiment. On the other hand, in the second embodiment, a low density range auxiliary point 1101 and a high density range auxiliary point 1102 are added to the low density range and the high density range, respectively. The low density range auxiliary point 1101 and the high density range auxiliary point 1102 are also included in the kinds of control points.

A control point selection table showing combinations of control points used to create a density adjustment table in the second embodiment is shown in FIG. 16A.

According to the control point selection table shown in FIG. 16A, for example, in a case where the adjustment of the low density range is performed, the low density range auxiliary point 1101 is also used as well as the low density range start point 601, the low density range intermediate point 602, and the low density range end point 604. Similarly, in a case where the adjustment of the high density range is performed, the high density range auxiliary point 1102 is also used as well as the high density range start point 606, the high density range intermediate point 608, and the high density range end point 609.

In a case where the adjustment of, for example, the low density range is performed in the first embodiment, a density adjustment table is created in which linear interpolation processing is performed between the low density range start point and the low density range intermediate point. However, the highlight part is the region for which a higher degree of tone reproducibility is required, and therefore, there is a case where adjustment becomes difficult to perform by linear interpolation. In contrast to this, in the second embodiment, by setting an auxiliary point in the region for which such a high degree of tone reproducibility is required, more detailed density adjustment is enabled. In the present embodiment, the low density range auxiliary point adjusts the density lower than that at the low density range intermediate point and the high density range auxiliary point adjusts the density higher than that at the high density range intermediate point.

In each density range, by simultaneously setting the auxiliary point and the intermediate point at the time of setting the adjustment level, adjustment is made easier. Further, for example, it is only required for a user to input the density range to be adjusted and the adjustment level via the operation screen as shown in FIG. 4 as in the first embodiment. Although not shown schematically, it may also be possible to determine whether or not to use the auxiliary point based on the instructions from a user as in the example of tone compensation shown in FIG. 9.

FIG. 16B is an intermediate point adjustment table showing the adjustment value at each intermediate point in a case where density adjustment is performed in the second embodiment.

In other words, in a case where the adjustment level of the low density range is set to "+2" in the direction of "Dark (+)", the low density range auxiliary point and the low density range intermediate point are also set to "+2" and the adjustment levels are 36 and 85, respectively. Similarly, in a case where the adjustment level of the low density range is set to "−2" in the direction of "Bright (−)", the low density range auxiliary point and the low density range intermediate point are also set to "−2" and the adjustment levels are 4 and 20, respectively.

In the above, one control point is added to the low density range and the high density range, respectively, but this is not limited and it is also possible to prepare, for example, two auxiliary points for the low density range.

As above, according to the second embodiment, it is made possible to easily maintain tone properties by a simple configuration also for the density range for which a higher degree of tone reproducibility is required, in addition to the density ranges in the first embodiment.

Third Embodiment

The density adjustment function includes uniform adjustment performed by changing the inclination of the density characteristics for each input color signal. Due to this, it is possible to uniformly perform density adjustment in all the density ranges for the input image data. In a third embodiment, an image processing apparatus is explained, which implements the same effect as that of the processing to perform density adjustment in all the density ranges as the above-described uniform adjustment by a combination of adjustment of density ranges.

In the third embodiment, the uniform adjustment of density is implemented by performing adjustment in all of a plurality of density ranges. The controller configuration of the image processing apparatus according to the third embodiment is the same as that in the first embodiment shown in FIG. 1.

Figure 12A:
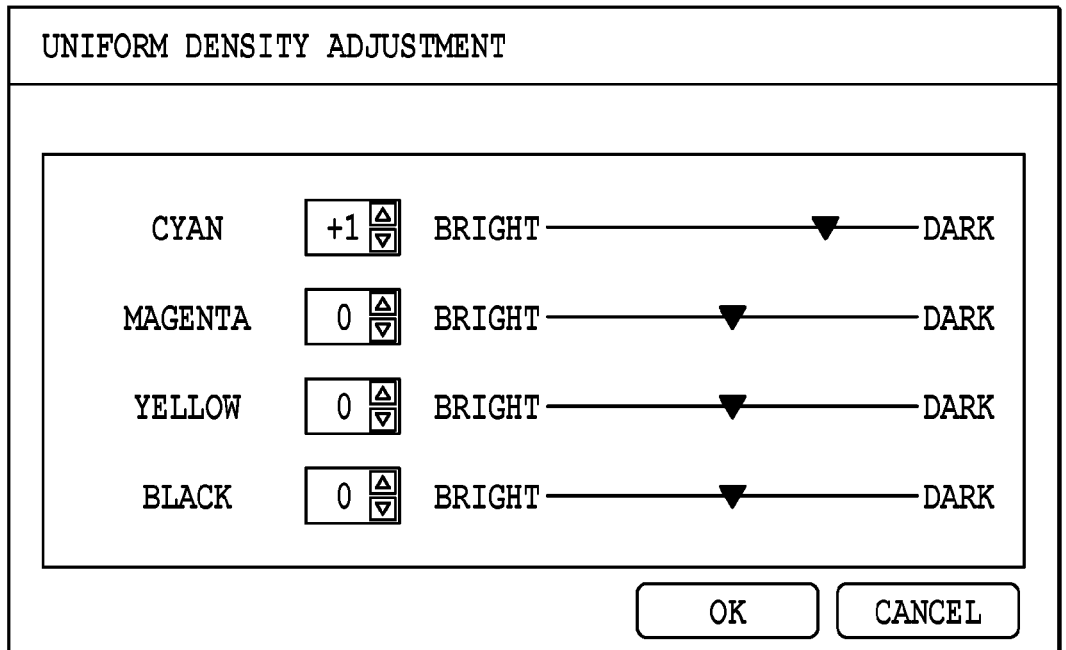
FIGS. 12A and 12B are diagrams showing an example of an adjustment screen of uniform density adjustment processing and an example of an adjustment screen of processing of adjustment by density range in a third embodiment, respectively.
Figure 12B:
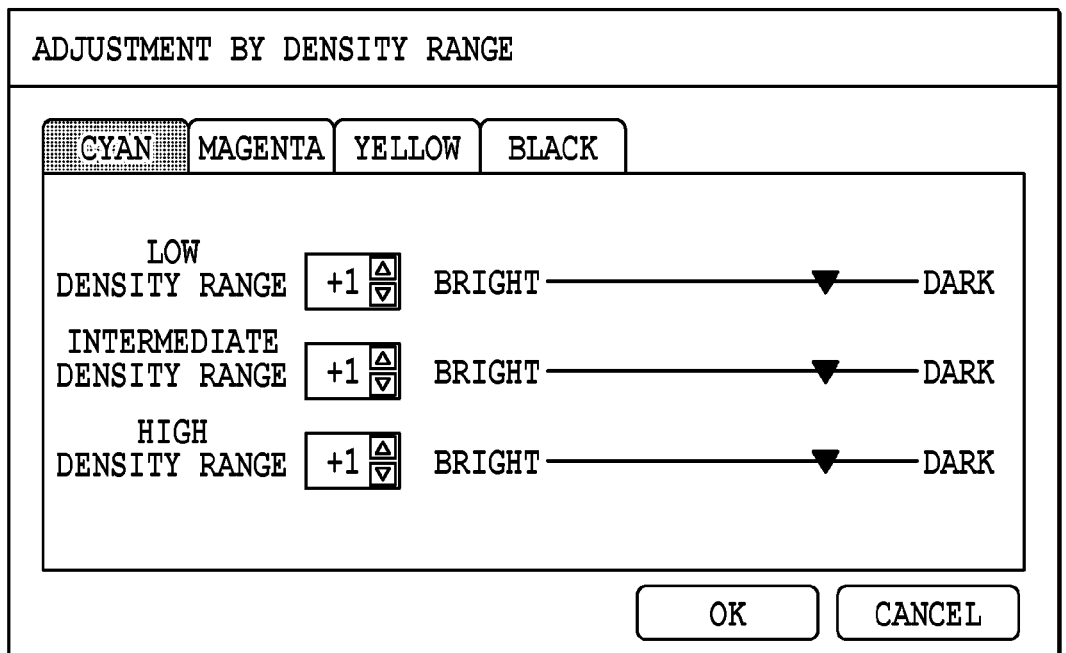

FIG. 12A is a diagram showing an example of an adjustment screen of the uniform density adjustment displayed by the operation unit 106 in the third embodiment and FIG. 12B is a diagram showing an example of an adjustment screen of the adjustment by density range. In the third embodiment, in a case where uniform density adjustment is set, the entire range of density range adjustment is set in an interlocking manner. For example, as shown in FIGS. 12A and 12B, in a case where cyan (C) is set to "+1" in the direction of "Dark" in the uniform density adjustment, the adjustment in each density range of C of the adjustment by density range is set to "+1" in the direction of "Dark" in an interlocking manner. In the examples in FIG. 12A and FIG. 12B, the examples are explained in which the adjustment screen of the uniform density adjustment and that of the adjustment by density range are interlocked with each other. However, in a case where the uniform density adjustment in FIG. 12A is set, it may also be possible to perform the processing corresponding to that in FIG. 12B within the density adjustment processing unit 206 and not to display the adjustment screen of the adjustment by density range in FIG. 12B.

In the present embodiment, it is possible for the combinations of the control points used to create a density adjustment table to be the same as those in the control point selection table shown in FIG. 14A. In other words, in a case where the uniform density adjustment is performed, the combination of the control points to be used is the low density range start point, the low density range intermediate point, the intermediate density range intermediate point, the high density range intermediate point, and the high density range end point used at the time of adjustment of the low, intermediate, and high density ranges. These are, in a case where the low, intermediate, and high density ranges, which are the density ranges to be adjusted, are regarded as a single density range, the start point (low density range start point) and the end point (high density range end point) in the single density range and the intermediate points in the density ranges included in the single density range (low density range intermediate point, intermediate density range intermediate point, and high density range intermediate point).

Figure 13A:
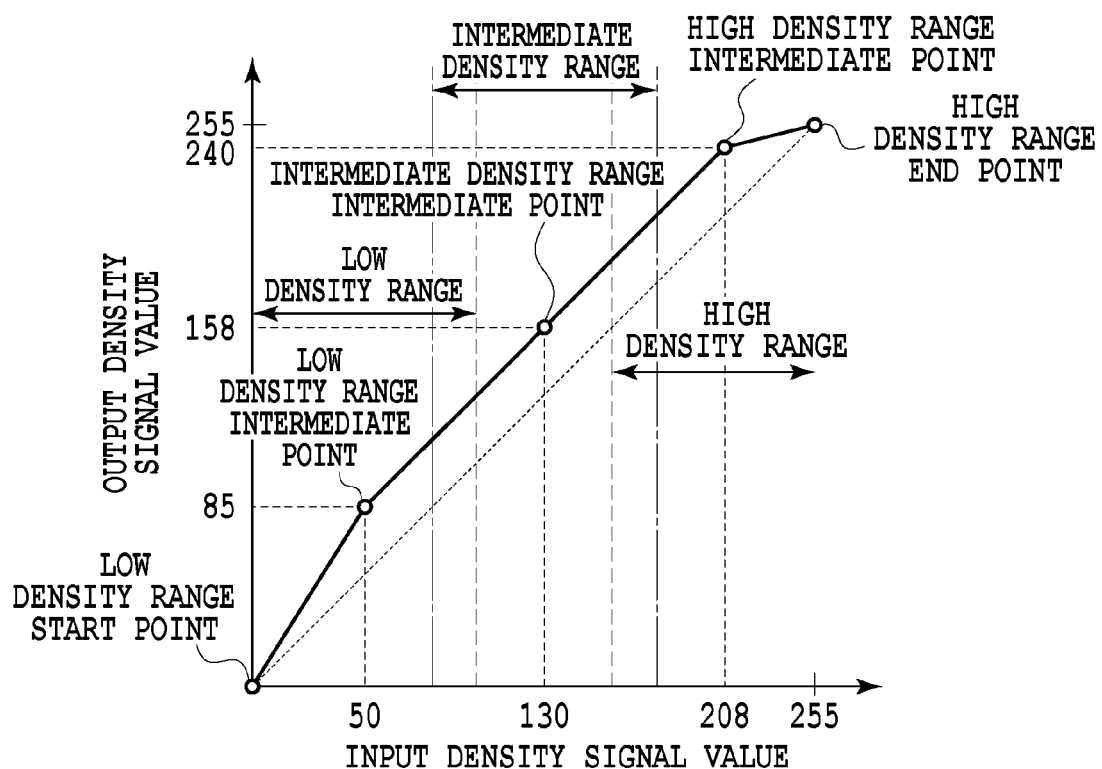
FIGS. 13A and 13B are diagrams each showing an outline of density adjustment table creation in the third embodiment.
Figure 13B:
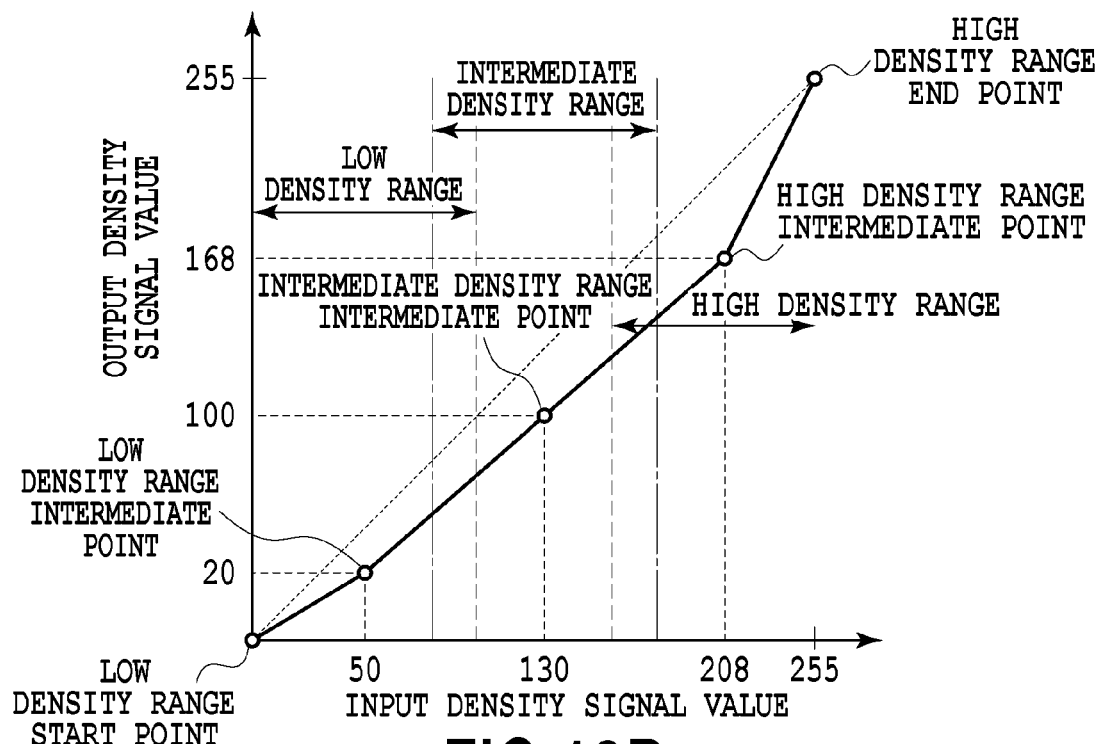

FIG. 13A and FIG. 13B each show an outline of density adjustment table creation in a case where the uniform density adjustment in the third embodiment is performed. FIG. 13A is an example of the linear interpolation table in a case where the adjustment level is adjusted to "+2" in the uniform density adjustment. As described above, the control points to be used are the low density range start point, the low density range intermediate point, the intermediate density range intermediate point, the high density range intermediate point, and the high density range end point. On the other hand, FIG. 13B is an example of the linear interpolation table in a case where the adjustment level is adjusted to "−2" in the uniform density adjustment. As the adjustment values at the respective intermediate points, those shown in FIG. 14B are used.

In the present embodiment, it is also possible to individually adjust each density range after uniformly performing density adjustment of all the density ranges in the uniform density adjustment. In other words, after performing density adjustment of the entire input image data, it is possible to further perform processing to adjust each density range in detail. For example, by setting the density of the whole to "−1", the density of each density range is set to "−1". After that, the density in the intermediate density range may be updated to the setting of "0".

As above, according to the third embodiment, in a case where the uniform density adjustment is performed, it is possible to utilize the function to independently adjust the density for a plurality of density ranges. Due to this, it is also possible to use the function of adjustment by density range as the uniform density adjustment function without the need to individually provide the uniform density adjustment function.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-210404, filed Oct. 7, 2013, which is hereby incorporated by reference herein in its entirety.

What is claimed is:

1. An image processing apparatus capable of performing density adjustment on a plurality of density ranges, comprising:
   an input unit configured to input an adjustment level of a density range independently on a plurality of density ranges based on a user's instruction;
   a determination unit configured to determine, in accordance with a combination of density ranges whose adjustment level have been input by the input unit, points to be used for an interpolation out of points dividing the density ranges whose adjustment level have been input by the input unit;
   an adjustment unit configured to adjust an output density level at an intermediate points in density characteristics used for the density adjustment based on the adjustment level input by the input unit;
   a generation unit configured to generate the density characteristics by interpolating between the points determined by the determining unit and the intermediate points whose output density level have been adjusted by the adjustment unit.

2. The image processing apparatus according to claim 1, wherein
   in a case where the adjustment level input by the input unit corresponds to adjustment levels for density ranges adjacent each other, the determining unit determines the points used for the interpolation by excluding a point located in the adjacent side in the density range, respectively.

3. The image processing apparatus according to claim 2, wherein
   the determination unit uses determines a start point and an end point as the points dividing the density range.

4. The image processing apparatus according to claim 1, wherein
   in a case where the density ranges whose adjustment level have been input by the input unit are a plurality of adjacent density ranges, the adjustment unit performs adjustment so that the maximum density level at an intermediate point in a lower density range of the adjacent density ranges becomes a density level smaller than a minimum density level at an intermediate point in a higher density range of the adjacent density ranges.

5. The image processing apparatus according to claim 1, wherein
   the adjustment unit performs adjustment so that a maximum density level at an intermediate point in the density range becomes a density level smaller than a density level at an end point in the density range.

6. The image processing apparatus according to claim 1, wherein
   in a case where an adjustment level of a high density range indicates to decrease the density, the adjustment unit performs adjustment to decrease a density level at an end point in the high density range.

7. The image processing apparatus according to claim 1, wherein
   in a case where a density range includes a low density range, the adjustment unit adjusts a plurality of intermediate points in the low density range.

8. The image processing apparatus according to claim 1, wherein
   in a case where a density range to be adjusted includes a high density range, the adjustment unit adjusts a plurality of intermediate points in the high density range.

9. The image processing apparatus according to claim 1, wherein
   the generation unit generates the density characteristics by performing linear interpolation between control points.

10. The image processing apparatus according to claim 1, wherein
    the generation unit generates the density characteristics by finding a Bezier curve between control points.

11. The image processing apparatus according to claim 1, wherein
    the input unit further input whether or not to adjust a density level at an end point in a high density range.

12. The image processing apparatus according to claim 1, further comprising a storage unit configured to store a selection table for specifying the points used for the interpolation associating with the combination of the density ranges and an intermediate point adjustment table for specifying the output density level at the intermediate point in each density range in accordance with an adjustment level, wherein
    the determination unit determines the points used for the interpolation by using the selection table, and
    the adjustment unit adjusts the output density level at the control point by using the control point adjustment table.

13. The image processing apparatus according to claim 1, wherein
    the points dividing the density ranges in the plurality of density ranges are set so that adjacent density ranges overlap.

14. The image processing apparatus according to claim 1, further comprising a control unit configured to perform density adjustment on image data based on the density characteristics generated by the generation unit.

15. An image processing method capable of performing density adjustment on a plurality of density ranges, comprising the steps of:
    inputting an adjustment level of a density range independently on a plurality of density ranges based on a user's instruction;
    determining, in accordance with a combination of density ranges whose adjustment level have been input in the inputting step, points to be used for an interpolation out of points dividing the density ranges whose adjustment level have been input in the input step;
    adjusting an output density level at an intermediate point based on the adjustment level input in the inputting step;
    generating the density characteristics data by interpolating between the points determined by the determining unit and the intermediate point whose output density level have been adjusted in the adjustment step.

16. A non-transitory computer readable storage medium storing a program which causes a computer to perform the image processing method, the method comprising the steps of:

inputting an adjustment level of a density range independently on a plurality of density ranges based on a user's instruction;
determining, in accordance with a combination of density ranges whose adjustment level have been input in the inputting step, points to be used for an interpolation out of points dividing the density ranges whose adjustment level have been input into the input step;
adjusting an output density level at an intermediate points in density characteristics used for the density adjustment based on the adjustment level input in the inputting step;
generating the density characteristics data by interpolating between the points determined by the determining unit and the intermediate point whose density output level have been adjusted in the adjustment step.

* * * * *